United States Patent
Das et al.

(10) Patent No.: US 7,774,283 B2
(45) Date of Patent: Aug. 10, 2010

(54) METHOD AND SYSTEM FOR USING A CAMERA CELL PHONE IN TRANSACTIONS

(75) Inventors: Pardeep K Das, Bethel, CT (US); David W. Spencer, Avon, CT (US)

(73) Assignee: Pitney Bowes Inc., Stamford, CT (US)

( * ) Notice: Subject to any disclaimer, the term of this patent is extended or adjusted under 35 U.S.C. 154(b) by 1436 days.

(21) Appl. No.: 11/064,409

(22) Filed: Feb. 23, 2005

(65) Prior Publication Data

US 2005/0197968 A1   Sep. 8, 2005

Related U.S. Application Data

(60) Provisional application No. 60/546,765, filed on Feb. 23, 2004.

(51) Int. Cl.
*H04K 1/00* (2006.01)
*H04L 9/00* (2006.01)

(52) U.S. Cl. .............................. 705/64; 705/51; 705/57; 705/71; 705/75

(58) Field of Classification Search .................. 705/64, 705/57
See application file for complete search history.

(56) References Cited

U.S. PATENT DOCUMENTS

| | | | | |
|---|---|---|---|---|
| 5,288,976 | A | * | 2/1994 | Citron et al. ................. 235/375 |
| 5,933,829 | A | | 8/1999 | Durst et al. .................... 707/10 |
| 5,978,773 | A | | 11/1999 | Hudetz et al. .................. 705/23 |
| 6,108,656 | A | | 8/2000 | Durst et al. .................... 707/10 |
| 6,199,048 | B1 | | 3/2001 | Hudetz et al. .................. 705/23 |
| 6,314,457 | B1 | | 11/2001 | Schena et al. ................. 709/219 |
| 6,327,570 | B1 | | 12/2001 | Stevens ......................... 705/7 |
| 6,377,986 | B1 | | 4/2002 | Philyaw et al. .............. 709/219 |
| 6,434,561 | B1 | | 8/2002 | Durst et al. .................... 707/10 |
| 6,448,979 | B1 | | 9/2002 | Schena et al. ............... 345/741 |

(Continued)

FOREIGN PATENT DOCUMENTS

JP          9-307617          11/1997

OTHER PUBLICATIONS

AirClic—"The AirClic Mobile Information Platform (MIP)" Business White Paper, prepared Nov. 2001—copyright.

(Continued)

*Primary Examiner*—Calvin L Hewitt, II
*Assistant Examiner*—Dante Ravetti
(74) *Attorney, Agent, or Firm*—Michael J. Cummings; Angelo N. Chaclas

(57) ABSTRACT

A method facilitating a transaction between a camera-phone user and a business entity. The business entity produces a printed medium indicating a transaction. The printed medium includes a barcode that includes direct contact data for communicating with the business entity. The barcode further includes specific transaction data relating to the transaction in the printed medium. Using the digital camera feature, the user captures a digital image of the barcode. The camera-phone is programmed to decode the digital image to retrieve the direct contact data and the transaction data embedded in the barcode. The camera-phone then automatically initiates a direct communication with the business entity via the mobile communications device using the decoded direct contact data. One communications are established, the camera phone further transmits the transaction data derived from the barcode to further facilitate the transaction.

10 Claims, 14 Drawing Sheets

U.S. PATENT DOCUMENTS

| | | | | |
|---|---|---|---|---|
| 6,512,919 | B2* | 1/2003 | Ogasawara | 455/422.1 |
| 6,542,933 | B1 | 4/2003 | Durst et al. | 709/229 |
| 6,616,049 | B1 | 9/2003 | Barkan et al. | 235/472.03 |
| 6,676,014 | B2 | 1/2004 | Catan | 235/375 |
| 7,156,311 | B2* | 1/2007 | Attia et al. | 235/462.46 |
| 2002/0019784 | A1 | 2/2002 | Ritz | 705/26 |
| 2002/0023215 | A1* | 2/2002 | Wang et al. | 713/171 |
| 2005/0125301 | A1* | 6/2005 | Muni | 705/23 |

OTHER PUBLICATIONS

AirClic—"wireless Camera Phones /PDA Scanners" http://www.airclic.com/devices/devoces_camera_scanners.html—retrived Feb. 2004.

Blueserker—"Peapod BuidAlist Service Using Bluetooth Camera Phones and Scanners"—retrived Aug. 2004 from, http://www.blueserker.com/html/modules.php?op=modload&name=New&file=article&si....

Digimarc—"Mobile Aplications"—http://www.digimarc.com/watermark/mobile/wireless_apps.asp—retrived Sep. 2004.

Semacode—"Too good to be true? AppForge Crossfire" http:semacode.org/ retrived Aug. 2004.

* cited by examiner

METHOD AND SYSTEM FOR USING A CAMERA CELL PHONE IN TRANSACTIONS

This application claims priority of provisional U.S. Patent Application 60/546,765, filed Feb. 23, 2004, and having the same title. That provisional application is hereby incorporated by reference in its entirety

FIELD OF THE INVENTION

The present invention relates generally to a method for initiating a transaction with a mobile communication device through an interaction with a printed media.

BACKGROUND OF THE INVENTION

Mobile communication devices having digital camera capabilities are well known. One popular example of such a device is a cell phone equipped with a digital camera. Among other things, a cell phone user may spontaneously take a picture with the camera, and transmit the picture to another phone at a remote location.

In general, mobile phones are also recognized as opportunities for greater flexibility and spontaneity in business transactions. With a cell phone providing constant communications capabilities, a user can make a call from anywhere to initiate a business transaction at any time he or she has an impulse to do so.

SUMMARY OF THE INVENTION

The present invention advantageously combines the communications aspect of the cell phone with the camera-phone's digital imaging capabilities in a novel manner. This advantageous combination enables a user to spontaneously initiate a transaction with a business entity immediately upon viewing some printed material produced by the business entity. Numerous types of transactions can be enabled using the present invention.

The present invention facilitates a transaction between a camera-phone user and a business entity. The business entity produces a printed medium indicating a transaction such as the sale of a product, or an offer for additional information. The printed medium includes a barcode that is embedded with direct contact data for communicating with the business entity. The barcode further includes specific transaction data relating to the transaction contemplated in the printed medium.

Using the digital camera feature, the user captures a digital image of the barcode. The camera-phone is programmed to decode the digital image to retrieve the direct contact data and the transaction data embedded in the barcode. The camera-phone then automatically initiates a communication with the business entity via the mobile communications device using the decoded direct contact data. Once communications are established, the camera phone transmits the transaction data derived from the barcode to further facilitate the transaction.

In one embodiment, the transaction data includes an identifier of a unique offer associated with the printed medium. Based on the identification of the offer, the business entity initiates the appropriate transaction routine for the communication. The unique offer transaction data may also include an identification of the particular medium from which the transaction data was retrieved. Thereby, the business entity can track the source of its incoming communications for marketing analysis purposes.

In a preferred embodiment, the camera-phone further stores user information. Such user information can be transmitted by the camera phone to further facilitate the transaction. For example, a users name, address, or account information can be stored in the phone's memory.

In the embodiment described above, the direct contact data is typically a phone number of the business entity, and the step of automatically contacting the business entity entails automatically dialing the decoded phone number derived from the barcode. Once contact is established, a human operator at the business entity may become part of the transaction, and the transaction may be carried out by voice communication. In one embodiment, the transaction is made more efficient by transmitting the stored user information from the camera phone to the business entity.

As an alternative to a telephone transaction, a different embodiment may be used for World Wide Web transactions. In that embodiment, the direct contact information is a web address, and the communication device automatically contacts the web address after decoding the image of the barcode.

Once a transaction is underway, the invention provides that an ongoing exchange of queries and responses may be used, depending on the nature of the transaction. Typically, the business entity will present a list of options, and the cell phone user can respond by transmitting an option selection.

DETAILED DESCRIPTION

Figure 1:
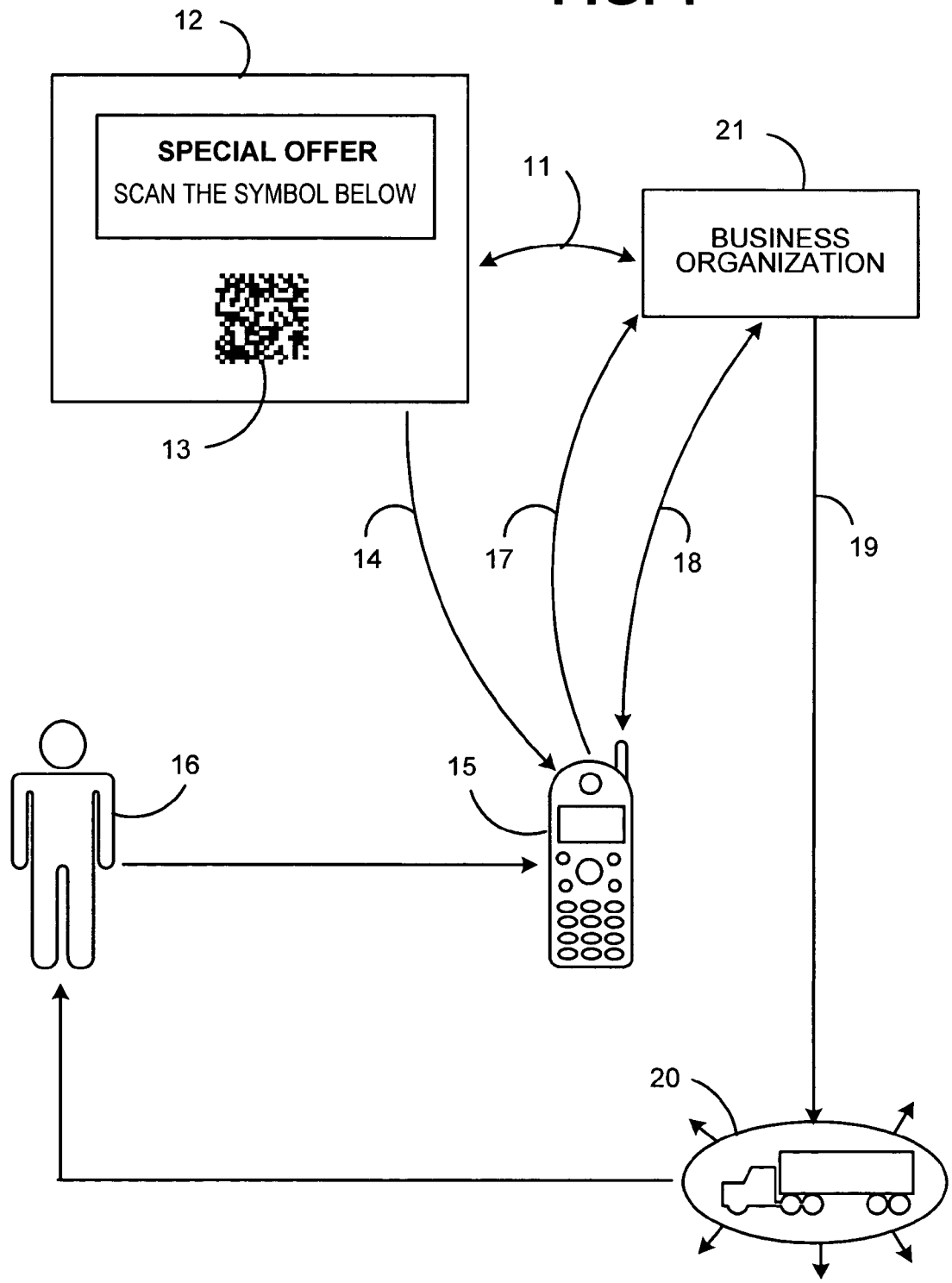
FIG. 1 depicts an embodiment of an overall system utilizing the present invention.

The invention described provides a method for executing business or personal transactions by using existing and available technology in a novel manner. The preferred method allows an individual to use a cell phone equipped with an integrated camera and associated software to initiate a business transaction. As depicted in FIG. 1, the user 16 starts the process by taking a picture (step 14) of a one or two-dimensional bar code 13 published on a print medium 12. This bar code 13 is then decoded by software embedded in the cell phone 15.

In the preferred embodiment, the decoded bar code 13 includes a phone number to be dialed, and additional information pertaining to the transaction. Once the picture of the bar code 13 has been taken and the information decoded, the cell phone 15 automatically dials the embedded telephone number (step 17) contacting business organization 21. Once communication is established, the cell phone 15 transmits the additional information to the receiving organization 21. In addition to this information, supplemental information about the owner 16 of the cell phone 15, including but not limited to name, address, or cell phone number may also be transmitted. Such supplemental information is gathered from data stored in the cell phone 15. This supplemental information allows the receiver to identify the caller and aids in competing the transaction.

At step 18, the business organization 21 can transmit information or queries back to the cell phone 15, and the user 16 may provide additional information, such as picking an option, or giving payment or confirmation instructions. In the depicted embodiment, in step 19, the business organization 21 fulfills the transaction by having goods shipped to the customer 16 by a delivery service 20.

In the preferred embodiment, the invention utilizes a software module included in the software suite supplied with cell phone 15. Other exemplary software applications in the suite may include conventional voice-mail, text messaging, web access, etc. The software supporting the present invention has the capability of decoding a bar code. The software may include, but is not limited to, the capability to decode one or two dimensional bar codes such as Maxicode, Aztec, etc.

As mentioned above, a telephone number is preferably encoded in the barcode along with other information. Such other information may include, but is not limited to a product number, special offer code, or some other identifier, as well as other information dependant upon the needs of the creator of the barcode. Such information is preferably used to assist in fulfilling the contemplated transaction.

The software module for use with the present invention may utilize the following steps: (1) Decode the bar code for its embedded information. If the picture is not of sufficient quality, the user may be prompted; (2) If the information from the bar code is decoded correctly, the phone is automatically dialed to the number embedded in the bar code; (3) Once the connection is made, the remaining information contained in the bar code is transmitted; (4) The receiving organization then processes the request. Such request may include a buying transaction, fulfillment transaction, an information query transaction, etc.; (5) The receiving organization may then send a message or series of messages back to the phone for the older of the cell phone to interact directly for such things as, but not limited to, paying options (credit card information, etc.), color of item, or other product and service choices. Alternatively, a live call center operator may come on the line to carry out the transaction with the caller, using the information already gathered.

In the preferred embodiment the bar code 13 will include both a unique code to identify the organization 21 and the telephone number to call. Additional information in the bar code 13 may include a unique identifier of the item or offer, product or service parameters unique to the offer, a code identifying the source of the bar code 13 (for example if the offer is made in more than one publication).

Figure 2:
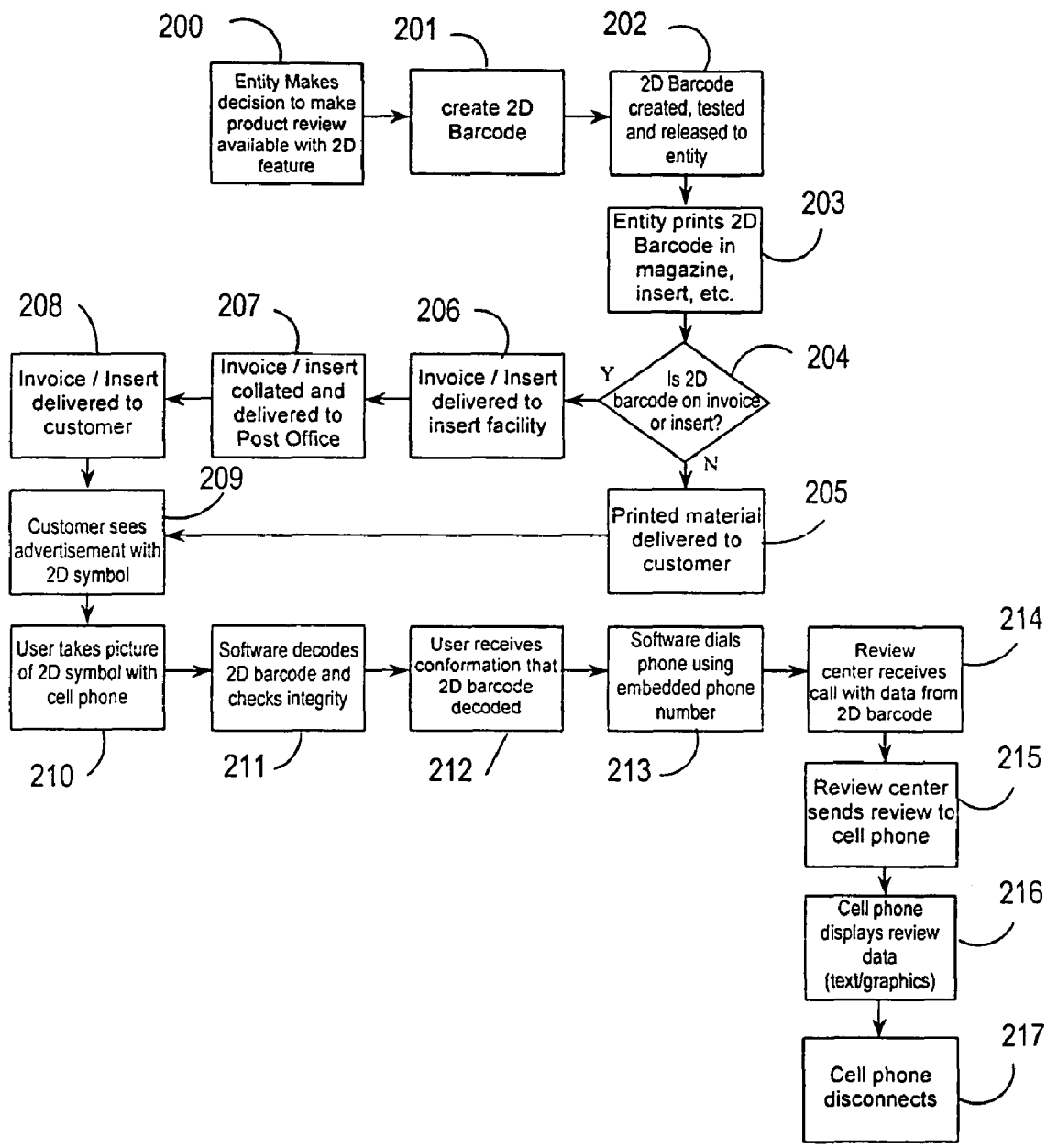
FIG. 2 depicts an exemplary embodiment for providing product review information.

A number of other embodiments and applications utilizing features of the basic invention are described in flow diagrams in FIGS. 2-14. FIG. 2 depicts a method of using a cell phone to look up product review information. For example, a printed medium advertisement might make a claim that the product advertised was rated better than competing products. A bar code is included with the advertisement that enables the viewer to access further information relating to the rating claim. In steps 200-217, this method allows an individual to use a cell phone equipped with an integrated camera and associated software, to initiate such a query transaction. In steps 200-208 the printed material included the bar code is created. In steps 209-210, the user initiates the process by taking a picture of a two-dimensional bar code published in a print medium. This bar code is then decoded by software embedded in the cell phone (steps 211, 212). The bar code contains but is not limited to the number to be dialed, and additional information pertaining to the transaction. Upon decoding of the barcode, the cell phone automatically dials the embedded telephone number, and transmits the information to the company with the query database (steps 213, 214). The information transmitted contains but is not limited to the information encoded in the barcode, and information pertaining to the individual phone initiating the call. In steps 215, 216 the review center transmits the rating and review information to the cell phone, where it is displayed on the cell phone screen. Upon completion of the transaction, the cell phone disconnects (step 217).

Figure 3:
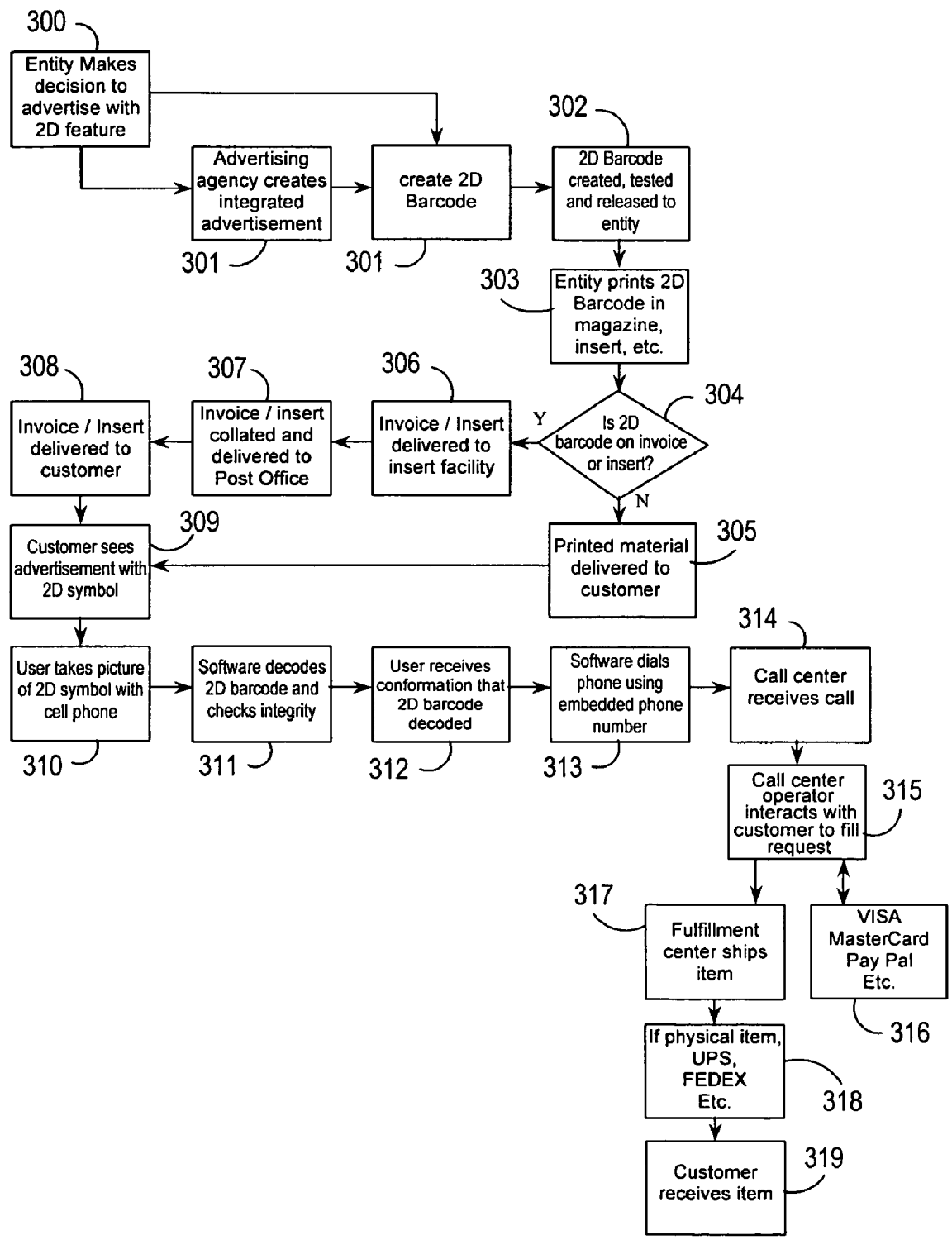
FIG. 3 depicts an exemplary embodiment for a purchase transaction.

FIG. 3 depicts more details of a process for a purchase transaction through a call center, comparable to what was described in connection with FIG. 1. Steps 300-319 of this method allow an individual to use a cell phone equipped with an integrated camera and associated software to initiate a fulfillment transaction. In steps 300-308, the printed material and barcode are created. In steps 309, 310 the user initiates the process by taking a picture of a two-dimensional bar code published in a print medium. This bar code is then decoded by software embedded in the cell phone (steps 311, 312). The bar code contains but is not limited to the number to be dialed, and additional information pertaining to the transaction. Upon decoding of the barcode, the cell phone automatically dials the embedded telephone number, connecting the customer with a traditional call center (steps 313-315). The call center personnel and the customer complete the transaction and fulfillment of the purchase is carried out (steps 316-319).

Figure 4:
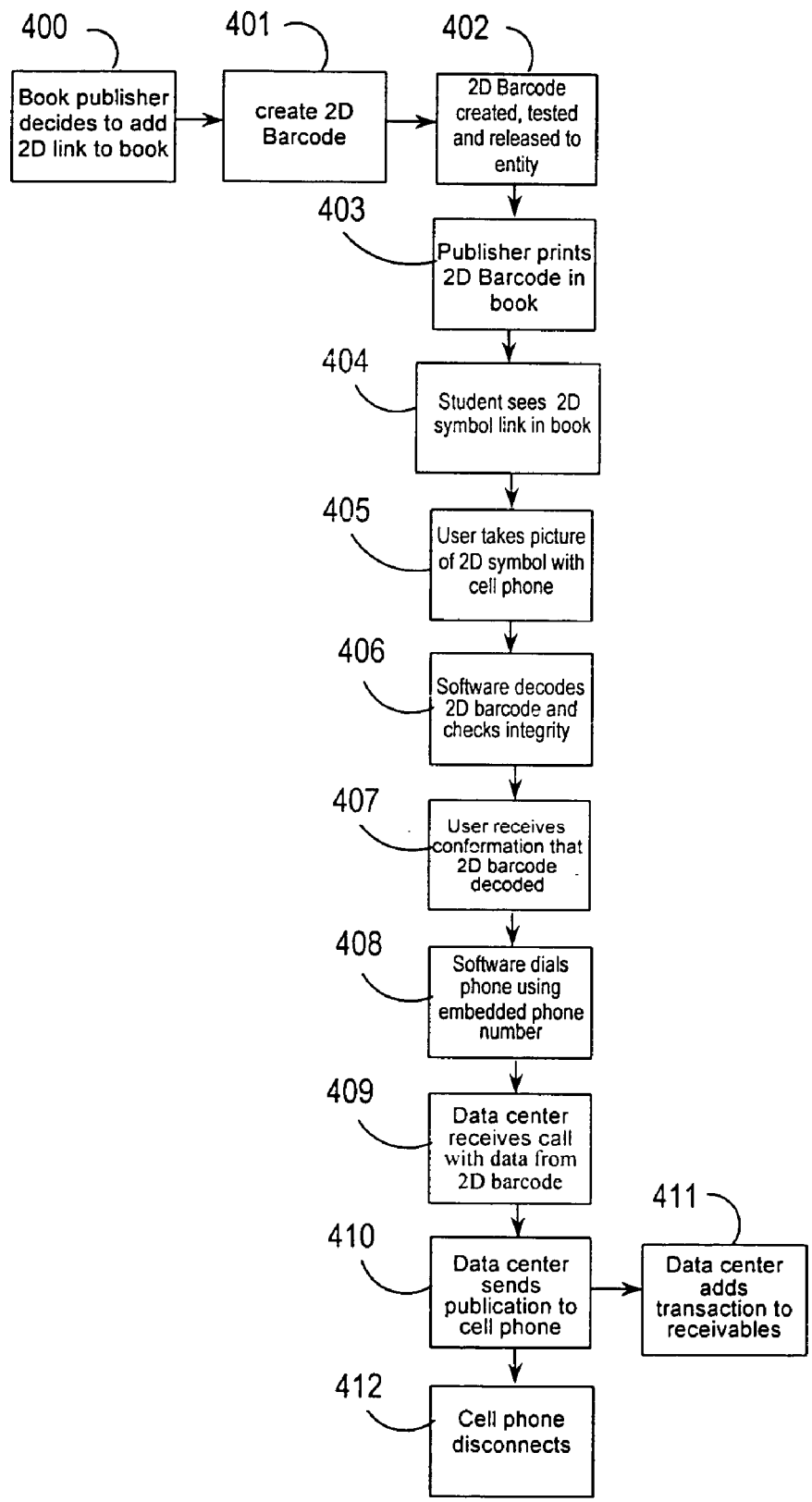
FIG. 4 depicts an exemplary embodiment for a purchase transaction initiated from a companion publication.

In FIG. 4, steps 400-412 depict a method of using cell phone to initiate purchase of a companion publication. Often a book may include a bibliography or footnotes that may be of interest to a reader wishing more information on a subject. For such references that the book publisher can provide to the reader, this method provides an easy way to quickly order the related publication. In steps 400-403, the publisher provides the bar code links for the companion publications in the book. The user initiates the process by taking a picture of a two-dimensional bar code published in a print medium (steps 405, 405). This bar code is then decoded by software embedded in the cell phone (406-408). The bar code contains but is not limited to the number to be dialed, and additional information pertaining to the transaction. Upon decoding of the barcode, the cell phone automatically dials the embedded telephone number, and transmits the information receiving fulfillment organization, particularly including the identification of the desired companion publication (steps 408, 409). In one embodiment, the companion publication may be sent directly to the cell phone (step 410). Alternatively, delivery of a hard-copy version of the publication may be initiated.

Preferably, the publishing entity processes the information and sends back a message to confirm the transaction is valid and has started. Through a series of messages between the cell phone and the fulfillment entity, messages, options, and menus of options may be displayed on the cell phone for the customer to answer. The types of information asked for could include but is not limited to type of document. The customer interacts with these questions/menus, and the answers are communicated back to the fulfillment entity.

The method of payment may be address by several methods. The first method will simply look like another question displayed on the cell phone. This may involve the customer entering in a valid charge card number and related information. This information is then verified by the fulfillment entity in direct communications with the charge-card company or bank. The second method requires that the customer has previously set up a payment scheme with the telecommunications operator. In this scheme, the fulfillment entity defers to the telecommunications operator to manage the payment. The telecommunications operator may handle the payment within its organization or initiate a transaction on a pre-determined charge or bank number. Upon completion of all questions required to complete the transaction, the purchased publication is downloaded to the cell phone, and the cell phone is disconnected. The fulfillment agency then enters the transaction into its database for billing. These payment options are applicable to any of the transactions described in this application.

Figure 5:
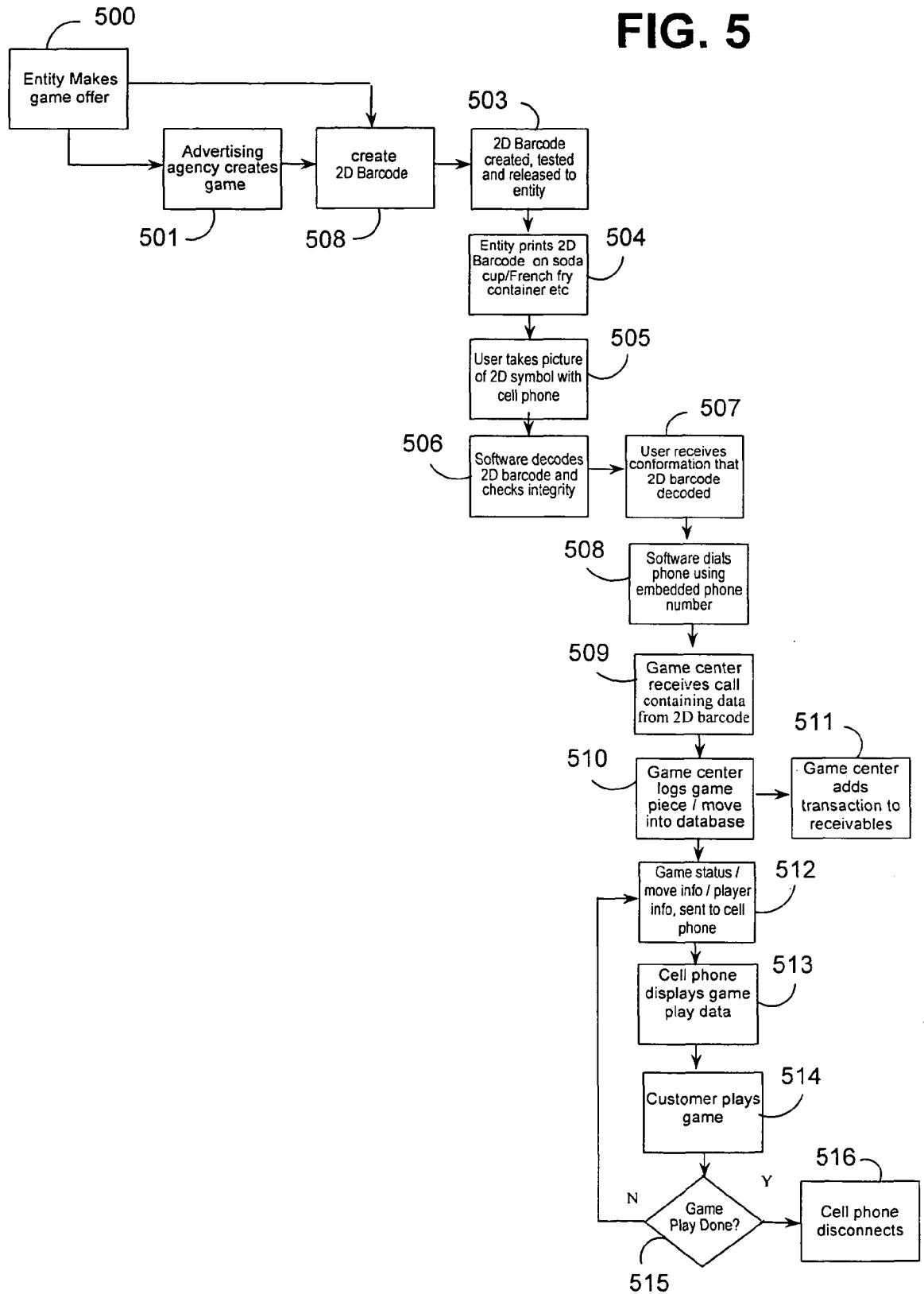
FIG. 5 depicts an exemplary embodiment for playing a promotional game.

FIG. 5 depicts a method of using cell phone to play a game. Steps 500-516 describe a way to allow game promotions by fast food restaurants, radio station, etc. This method allows an individual to use a cell phone equipped with an integrated camera and associated software, to initiate a game transaction. In steps 500-504, the game entity creates a medium, for example a soda cup, having a bar code printed on it. In step 505, the user initiates the process by taking a picture of a two-dimensional bar code published in the print medium. This bar code is then decoded by software embedded in the cell phone (steps 506, 507). The bar code contains but is not limited to the number to be dialed, and additional information pertaining to the transaction. Upon decoding of the barcode, the cell phone automatically dials the embedded telephone number, and transmits the information to the game organization (steps 508, 509). The information transmitted may contain, but is not limited to, the information encoded in the barcode and information pertaining to the individual phone initiating the call.

The game entity then processes the information and sends back a message or series of messages according to the game play (steps 510-515). Once the game turn is over, a confirmation message is sent to the cell phone, which is then disconnected (step 516).

Figure 6:
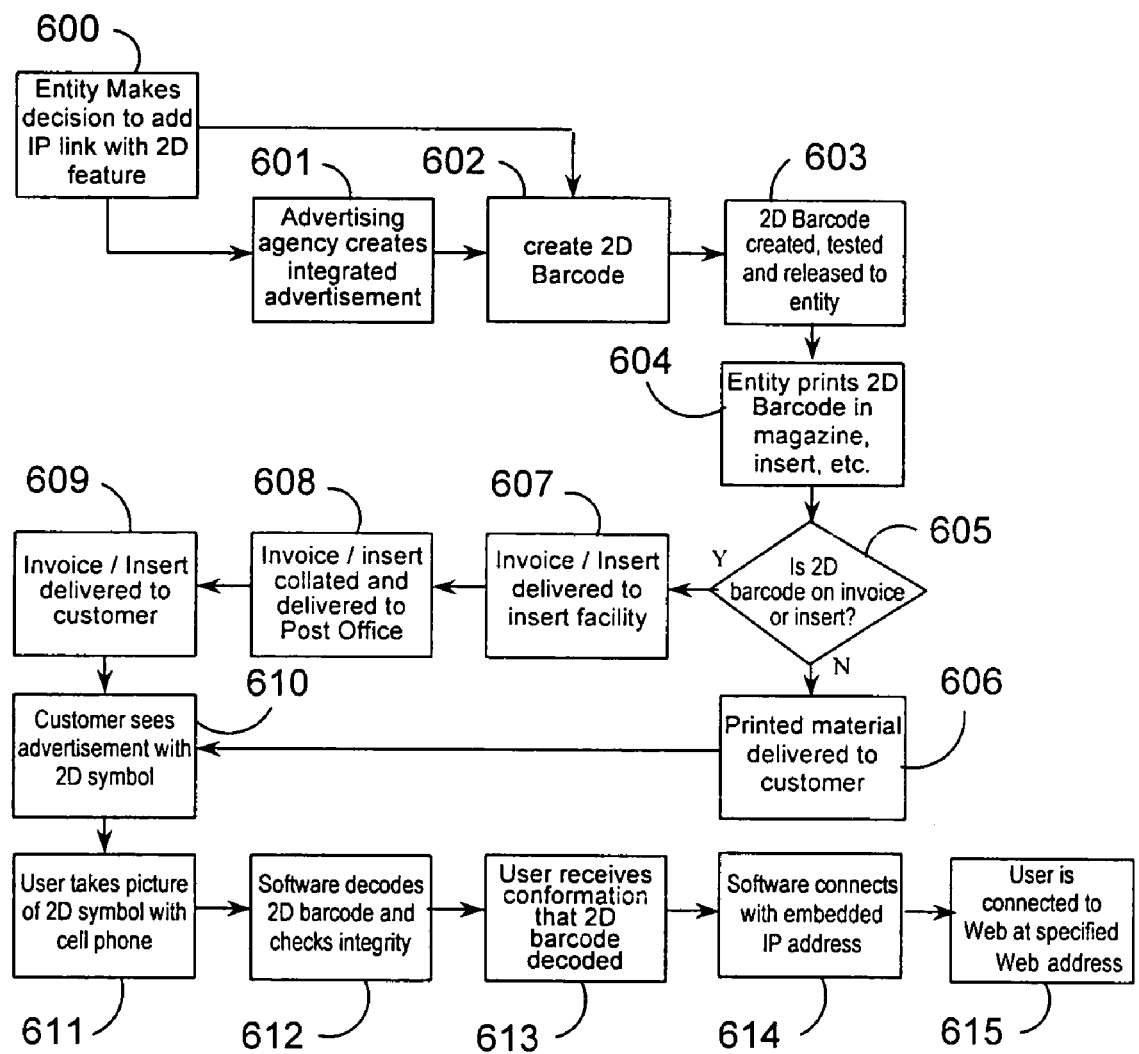
FIG. 6 depicts an exemplary embodiment for accessing an Internet web-site.

FIG. 6 depicts an alternate embodiment for using a cell phone to automatically initiate a connection to an Internet site. Steps 600-615 describe steps to allow an individual to use a cell phone equipped with an integrated camera and associated software, to initiate a connection to a web site on the cell phone. Steps 600-609 describe the creation of the print medium and associated bar code. At steps 610, 611, the cell phone user initiates the process by taking a picture of a two-dimensional bar code published in the print medium. This bar code is then decoded by software embedded in the cell phone (steps 612, 613). The bar code contains but is not limited to the IP address to be connected to. Upon decoding of the barcode, the cell phone automatically connects the internet-enabled phone with the specified Internet site (steps 614, 615).

Figure 7:
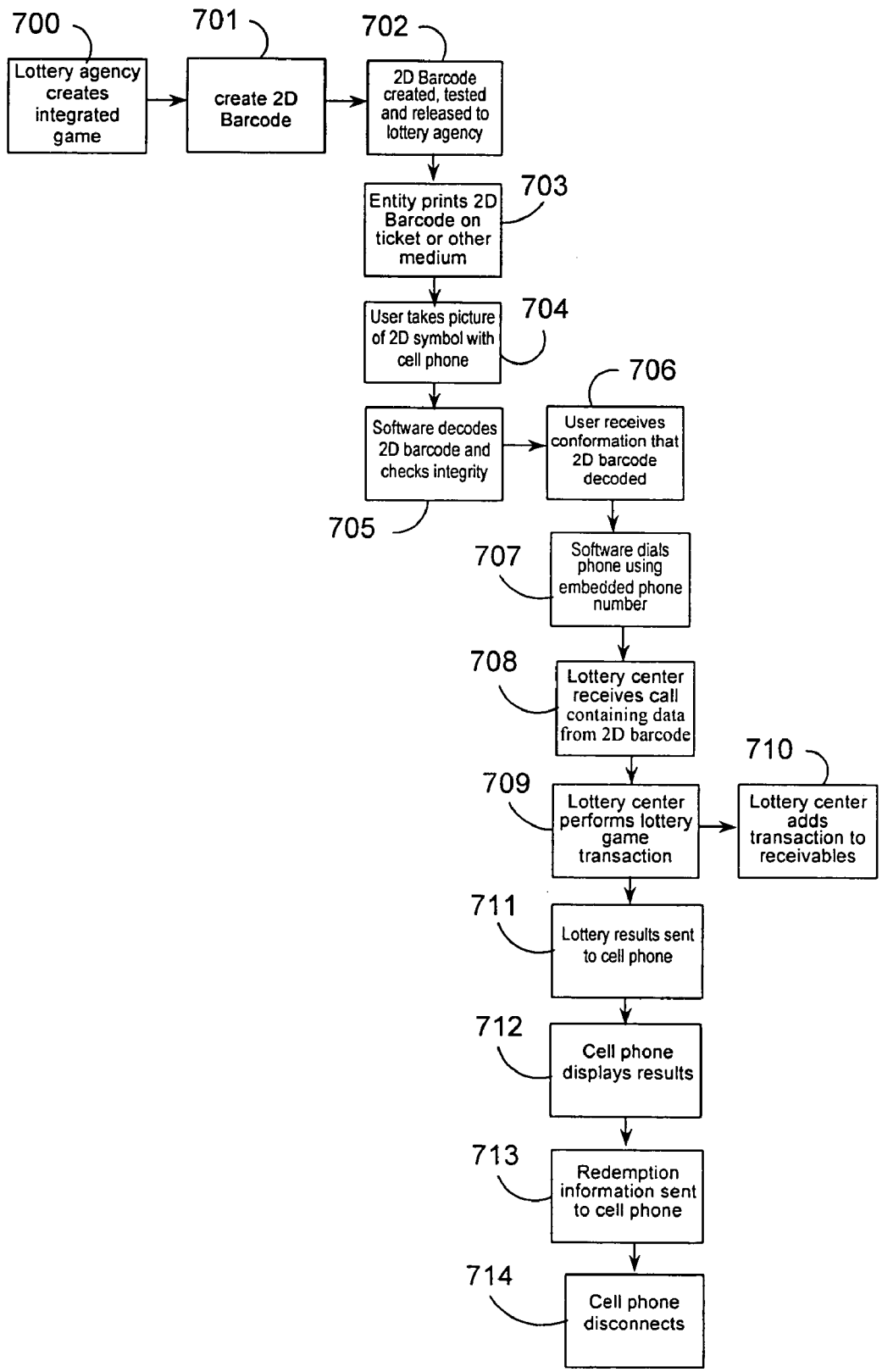
FIG. 7 depicts an exemplary embodiment for playing a lottery game.

FIG. 7 depicts a method of using a cell phone to automatically initiate an instant lottery game play (in contrast to the promotional type game of FIG. 5). Steps 700-714 allow an individual to use a cell phone equipped with an integrated camera and associated software to initiate a lottery transaction. In steps 700-703, the lottery authority creates a lottery ticket having a bar code printed on it. At step 704, the user initiates the process by taking a picture of a two-dimensional bar code published on the ticket. This bar code is then decoded by software embedded in the cell phone (steps 705, 706). The bar code contains but is not limited to the number to be dialed, and additional information pertaining to the game ticket. Upon decoding of the barcode, the cell phone automatically dials the embedded telephone number, and transmits the information to the lottery organization (steps 707, 708). The information transmitted contains but is not limited to the information encoded in the barcode and information pertaining to the individual phone initiating the call.

The lottery organization then processes the information and sends back a message or series of messages according to the game play (steps 709-713). Once the game turn is over, a confirmation message is sent to the cell phone. This information can include but is not limited to where winnings can be claimed. The cell phone is then disconnected (step 714). This method allows interactive games to be played based on time or the number of active participants.

Figure 8:
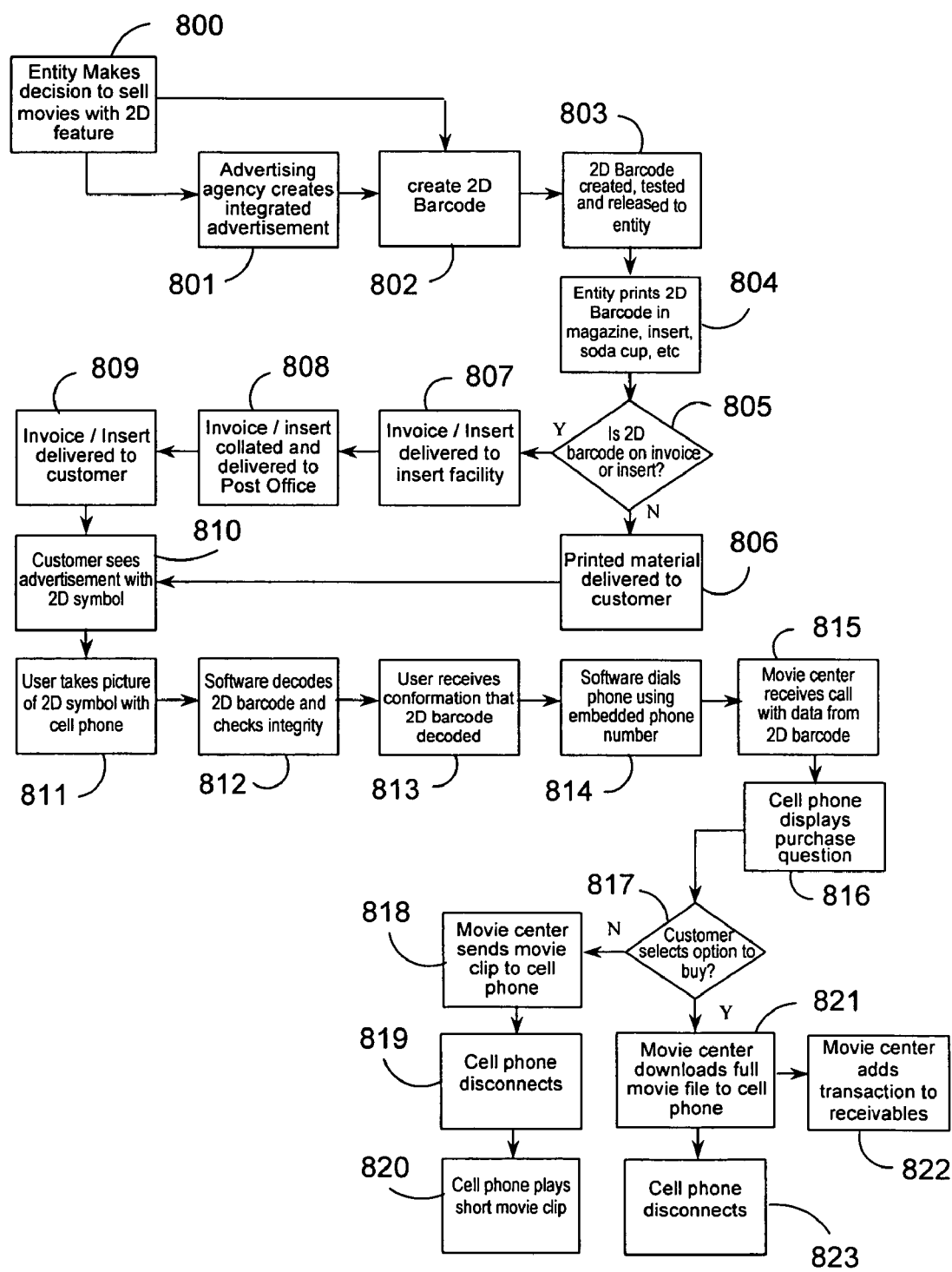
FIG. 8 depicts an exemplary embodiment for accessing a movie preview.

FIG. 8 depicts a method of using cell phone to automatically download a movie clip with option to buy. Steps 800-823 provide a method for a customer to use his/her cell phone to view a promoted movie trailer, and optionally to buy the full movie. This also has the benefit of allowing the customer to easily try multiple trailers in a convenient fashion. This method allows an individual to use a cell phone equipped with an integrated camera and associated software, to initiate a fulfillment transaction. Steps 800-809 describe steps for creating the printed medium and associated bar code for the movie promotion. At step 810-811, the user initiates the process by taking a picture of a two-dimensional bar code published in a print medium. This bar code is then decoded by software embedded in the cell phone (steps 812, 813). The bar code contains but is not limited to the number to be dialed, and additional information pertaining to the transaction. Upon decoding of the barcode, the cell phone automatically dials the embedded telephone number, and transmits the information to the movie fulfillment organization (steps 814, 815). The information transmitted contains but is not limited to the information encoded in the barcode and information pertaining to the individual phone initiating the call.

The movie fulfillment entity then processes the information and sends back a question if the customer wants a limited clip of the specified movie or to buy the movie (steps 815-817). If the customer wants a limited time clip, it is sent back to the customer and the phone disconnects (steps 818-820). If the customer wants the entire movie, it is sent and the transaction is entered into the receivables system of the movie fulfillment entity (steps 821-823). Movie offers can be printed on soda cups or cans, French fry containers, tickets, etc.

Figure 9:
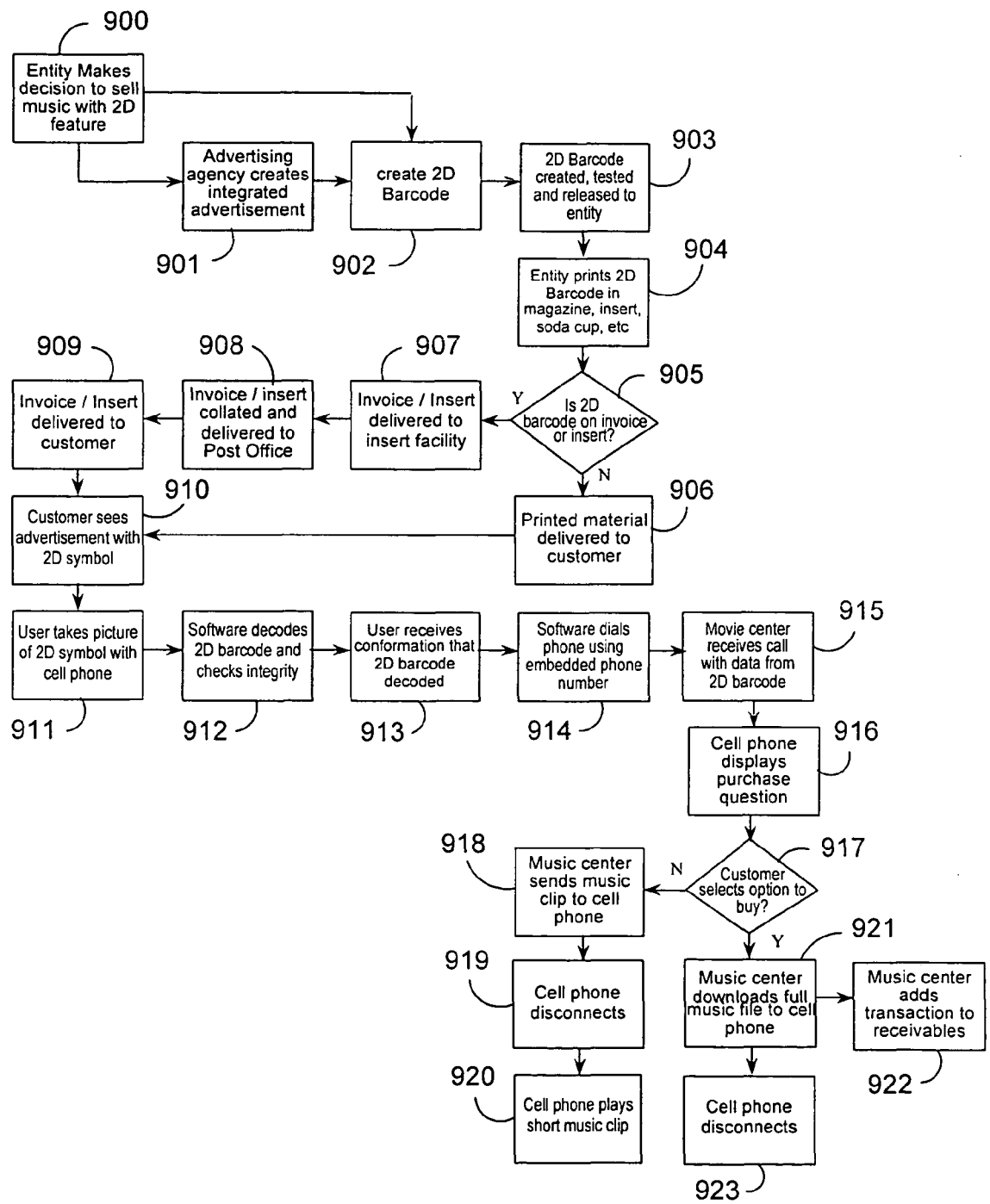
FIG. 9 depicts an exemplary embodiment for accessing a music clip.

Similar to FIG. 8, steps 900-923 of FIG. 9 depict a transaction for downloading music, instead of movies. These steps allow the customer to use his/her cell phone to try a promoted piece of music and optionally buy the full piece. This also has the benefit of allowing the customer to easily try multiple pieces of music in a seamless convenient fashion.

Figure 10:
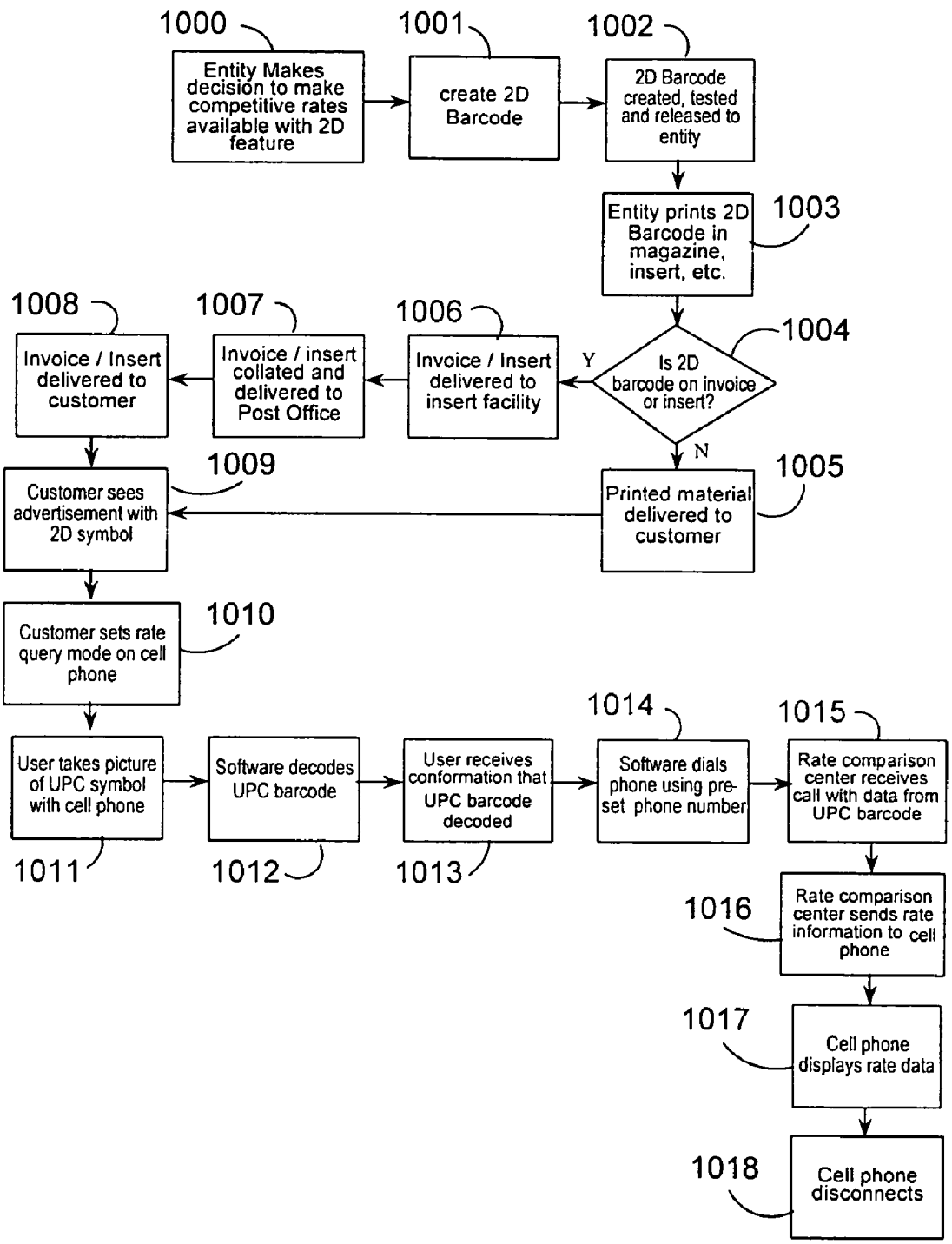
FIG. 10 depicts an exemplary embodiment for accessing competitive rate information.

FIG. 10 depicts an alternative embodiment of a method of using cell phone to automatically lookup competitive rate information. Steps 1000-1018 provide a method for retrieving a rate comparison on the cell phone using existing UPC markings already existing on a product. This method allows an individual to use a cell phone equipped with an integrated camera and associated software, to initiate a rate query transaction. In step 1000, an entity gathers competitive rate information for a variety of products. In steps 1001-1008, a UPC bar code for a given product is published on a printed medium. The user initiates the process by setting the cell phone in the mode for making rate queries, and then taking a picture of the UPC bar on the item in question (steps 1009-1011). The UPC bar code is then decoded by software embedded in the cell phone (steps 1012, 1013). Upon decoding of the barcode, the cell phone automatically dials a pre-set telephone number, and transmits the information to the company with the query database (steps 1014, 1015). The information transmitted may contain, but is not limited to, the information encoded in the barcode, and information pertaining to the individual phone initiating the call.

The query database then processes the rate request and sends back the requested information (steps 1016, 1017). Included in the returned information may be advertising material.

Figure 11:
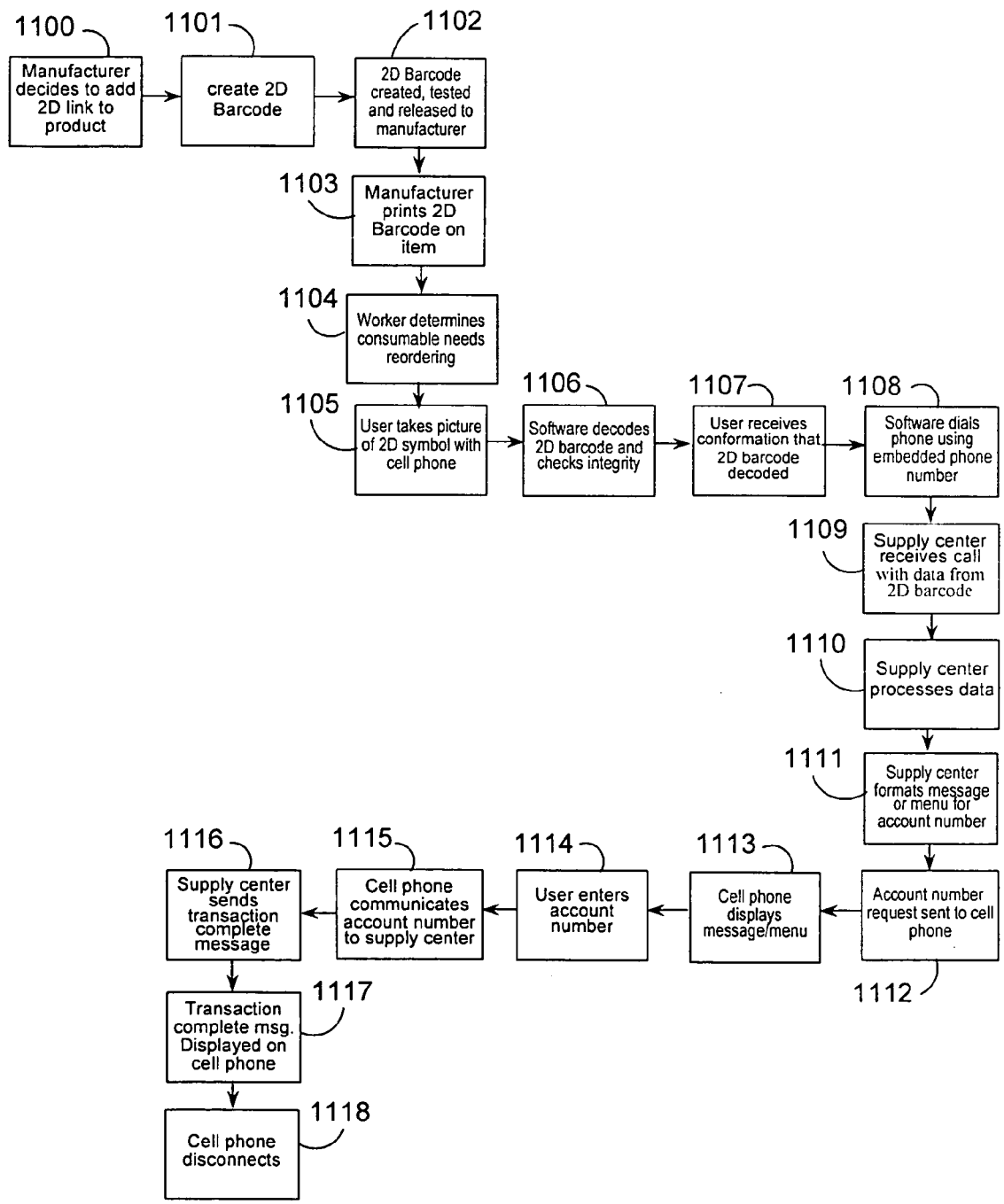
FIG. 11 depicts an exemplary embodiment for an automatic purchase transaction for a consumable item.

FIG. 11 depicts a method of using cell phone to automatically initiate a purchase transaction for a consumable item. Steps 1100-1118 of this method allow an individual to use a cell phone equipped with an integrated camera and associated software, to initiate a fulfillment transaction for consumable items. In steps 1100-1103, a manufacturer prints a specialized bar code in accordance with this invention on a consumable item. When a user realizes that new consumable items are needed, the user initiates the process by taking a picture of a two-dimensional bar code published in a print medium on the product or the product packaging (steps 1104, 1105). This bar code is then decoded by software embedded in the cell phone (steps 1106, 1107). The bar code contains but is not limited to the number to be dialed, and additional information pertaining to the transaction. Upon decoding of the barcode, the cell phone automatically dials the embedded telephone number, and transmits the information receiving fulfillment organization (steps 1108, 1109). The information transmitted may contain, but is not limited to, the information encoded in the barcode and information pertaining to the individual phone initiating the call.

The fulfillment entity then processes the information and sends back a message to confirm the transaction is valid and has started (steps 1110, 1111). The cell phone asks for the account number (and possibly password) of the customer, and this information is sent to the fulfillment entity (steps 1112-1115). The fulfillment entity then completes the transaction by entering the data into its order system, a confirmation message is sent to the cell phone, and the cell phone is disconnected (steps 1116-1118).

Figure 12:
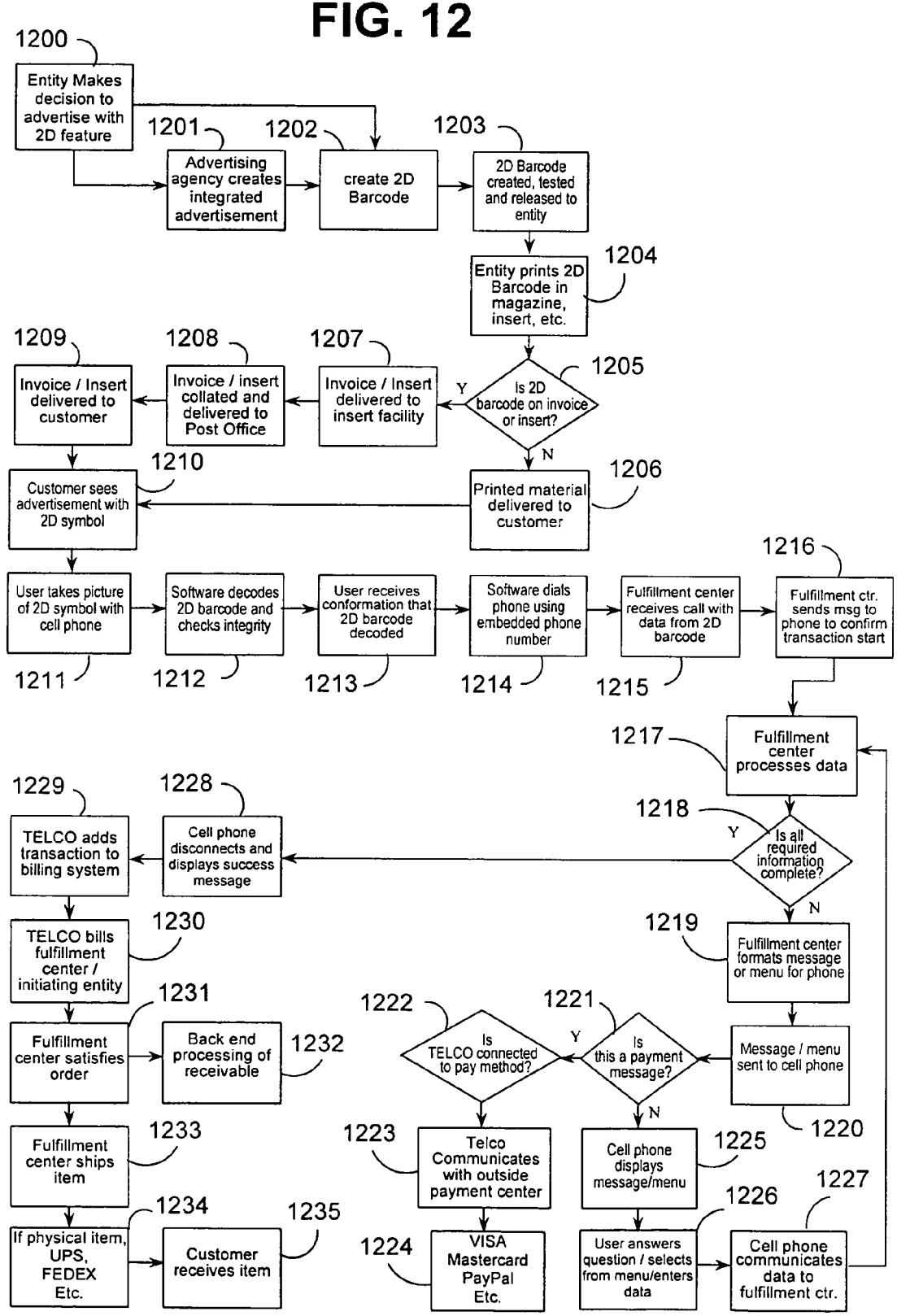
FIG. 12 depicts an exemplary embodiment for using a cell phone as a point of sale.

FIG. 12 depicts a detailed embodiment for using a cell phone as a point of sale. Steps 1200-1235 allow an individual to use a cell phone equipped with an integrated camera and associated software, to initiate a fulfillment transaction. In steps 1200-1209 an entity creates a printed medium including the bar code for the intended transaction. At steps 1210, 1211, the user initiates the process by taking a picture of a two-dimensional bar code published in a print medium. This bar code is then decoded by software embedded in the cell phone (step 1212, 1213). The bar code contains but is not limited to the number to be dialed, and additional information pertaining to the transaction. Upon decoding of the barcode, the cell phone automatically dials the embedded telephone number, and transmits the information to the receiving fulfillment organization (steps 1214, 1215). The information transmitted contains but is not limited to the information encoded in the barcode and information pertaining to the individual phone initiating the call.

The fulfillment entity then processes the information and sends back a message to confirm the transaction is valid and has started (step 1216). Through a series of messages between the cell phone and the fulfillment entity, messages, options, and menus of options are displayed on the cell phone for the customer to answer (steps 1217-1221, 1225-1227). The types of information asked for could include but is not limited to color, size, shipment options etc. The customer interacts with these questions or menus, and the answers are communicated back to the fulfillment entity.

The method of payment may be addressed by several methods. The first method (steps 1221-1224) will simply look like another question displayed on the cell phone. This may involve the customer entering in a valid charge card number and related information. This information is then verified by the fulfillment entity in direct communications with the charge-card company or bank.

The second method (steps 1228-1230) requires that the customer has previously set up a payment scheme with the telecommunications operator. In this scheme, the fulfillment entity defers to the telecommunications operator to manage the payment. The telecommunications operator may handle the payment within its organization or initiate a transaction on a pre-determined charge or bank number.

Upon completion of all questions required to complete the transaction, the cell phone notifies the customer that the transaction has been completed, and breaks the connection with the fulfillment entity. The fulfillment agency then enters the transaction into its database for normal fulfillment of the order including shipment (steps 1230-1235).

Figure 13:
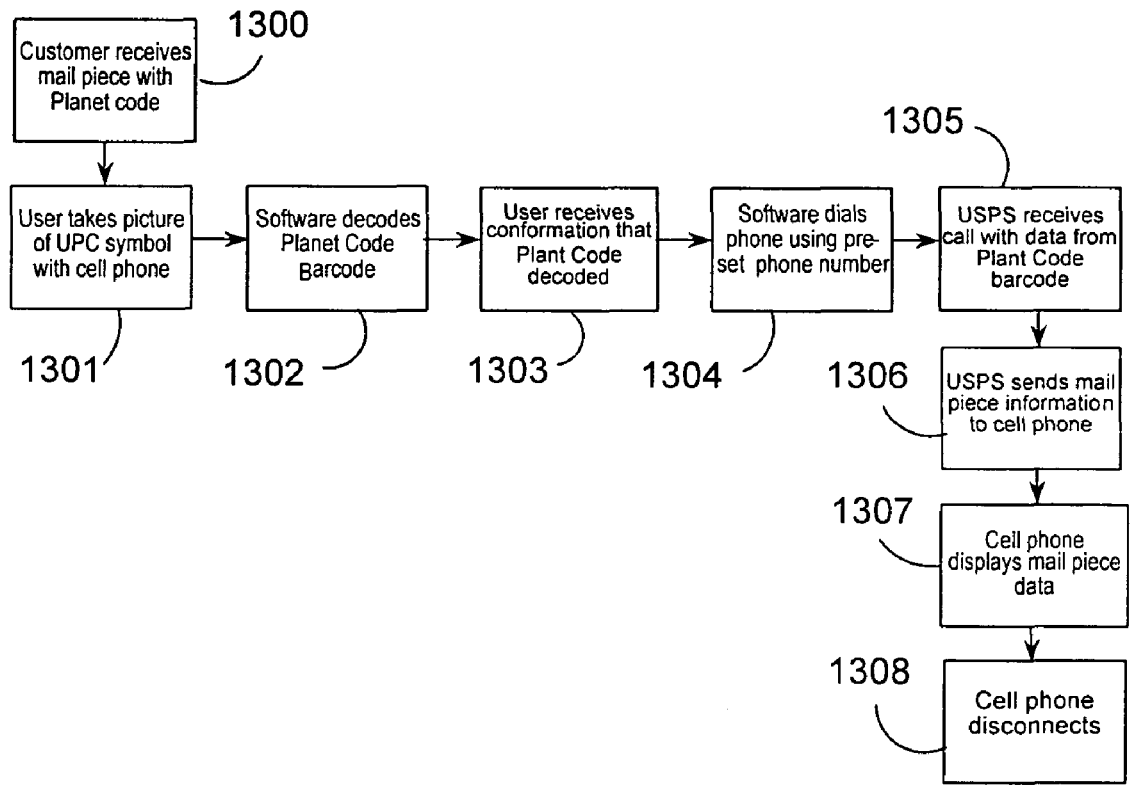
FIG. 13 depicts an exemplary embodiment for using a cell phone for tracking an item of mail.

FIG. 13 depicts an embodiment for using a cell phone to query mail piece information using Planet Code information printed on the mail piece. Steps 1300-1308 of this method allows an individual to use a cell phone equipped with an integrated camera and associated software to initiate a query of the information about a mail piece. At steps 1300-1301, the user initiates the process by taking a picture of the Planet Code on the mail piece in question. The Planet Code is then decoded by software embedded in the cell phone (step 1302, 1303). Upon decoding of the barcode, the cell phone automatically dials a pre-set telephone number connect it with a Planet Code database, such as the one owned and maintained by the United States Postal Service (step 1304, 1305). The query database then processes the request and sends back the postal information pertaining to that mail piece (steps 1306, 1307).

Figure 14:
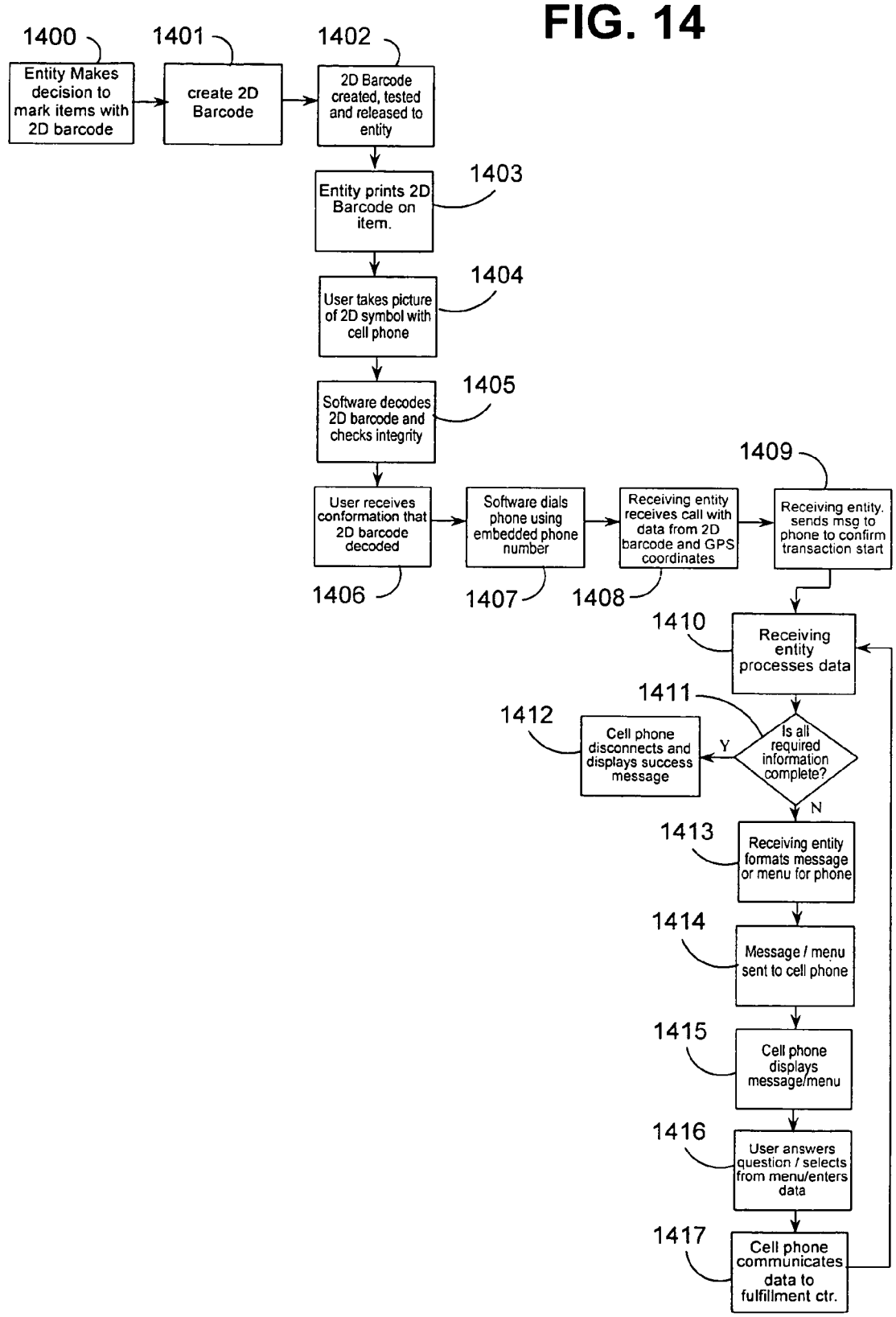
FIG. 14 depicts an exemplary embodiment for tracking individual items through a geographical area.

FIG. 14 depicts a method of using a cell phone to track individual items through a geographical area using a two-dimensional bar code. Steps 1400-1417 allow an individual or company to keep track of mobile assets. This method allows an individual to use a cell phone equipped with an integrated camera and associated software, to initiate a item-location transaction. In steps 1400-1403, an entity imprints a bar code on an item. A cell phone user initiates the process by taking a picture of a two-dimensional bar code published in a print medium (step 1404). This bar code is then decoded by software embedded in the cell phone (step 1405, 1406). The bar code contains but is not limited to the number to be dialed, and additional information pertaining to the transaction. Upon decoding of the barcode, the cell phone automatically dials the embedded telephone number, and transmits the information decoded from the barcode (step 1407). The information transmitted may contain, but is not limited to, the information encoded in the barcode and information pertaining to the individual phone initiating the call and the GPS coordinates of the cell phone taking the picture.

The receiving entity then processes the information and sends back a message to confirm the transaction has started (step 1408, 1409). Through an optional series of messages between the cell phone and the receiving entity, messages, options, and menus of options are displayed on the cell phone for the user to answer (steps 1413-1417). The information asked for is dependent upon the type of entity using the technology. The individual interacts with these questions/menus, and the answers are communicated back to the receiving entity. When the questions are complete, the cell phone hangs up and the transaction is complete (step 1412).

Data Format

The following listing describes a preferred embodiment of the contents and format of the data encoded within the printed 2D symbol for use with the present invention:

| Description | Type | Size (bytes) |
| --- | --- | --- |
| Version | Binary | 1 |
| Mode | Binary | 1 |
| 0 Test (internal use only) | | |
| 1 Voice fulfillment (dials phone only) | | |
| 2 Automated fulfillment (interactive text mode) | | |
| Reserved | | 14 |
| Telephone number/IP Address | Numeric | 16 |
| Vendor ID | Alpha-numeric | 16 |
| Description | Size | |
| Type | 1 | |
| 0 Test (internal use only) | | |
| 1 Retail | | |
| 2 Fulfillment | | |
| Unique Identifier | 15 | |
| Product/Offer ID (assigned by vendor) | Alpha-numeric | 16 |
| Expiration Date | | 2 |
| Reserved | | 30 |
| Integrity Checksum | Binary | 2 |
| CRC16 | Binary | 2 |
| Total | | 100 |

The following describes a preferred embodiment of the packet protocol to be used to communicated between the cell phone 15 and the business organization 21:

| Description | Type | Size (bytes) |
| --- | --- | --- |
| Start of Message Token | Numeric (always 0xAA) | 1 |
| Sequence Number | Binary (0x00-0xFF) | 1 |
| Payload type | Binary | 1 |
| Payload | Alpha-numeric | Dependent on type |
| CRC16 | Binary | 2 |
| End of Message Token | Numeric (always 0x55) | 1 |

Start of Message Token

This value is always 0xAA and marks the beginning of a new message

Sequence Number

This value is a sequence number, starting at 0x00 and incrementing by 1 for each subsequent message, rolling over to 0x00 after the value 0xFF. This is used to insure message level integrity, especially important when the desired payload is larger than the maximum payload allowed by a single message.

Payload Type

This value defines the type of payload carried by this message. In addition, the payload type defines the total length of the payload, and thus the total length of the message.

| | |
| --- | --- |
| 0x00 | Reserved |
| 0x01 | Initial Message |
| 0x02 | On-The-Fly Menu definition |
| 0x03 | Menu response |
| 0x04 | Continuation of previous payload |
| 0x05 | Raw binary data |
| 0x06 | Payment arranged by TELCO |
| 0x07-0xEF | Future payload type identifiers |
| 0xF0-0xFF | Reserved |

Payload

Dependant upon payload type

CRC16

Cyclical Redundancy Check value (16 bit)

End of Message Token

This value is always 0x55 and marks the end of the message

Initial Message

The first message sent from the cell phone 15 to the organization 21 (Payload Type 1) contains:

| From 2D Symbol: | | |
| --- | --- | --- |
| Version | Binary | 1 |
| Mode | Binary | 1 |
| 1. Test (internal use only) | | |
| 2. Voice fulfillment (dials phone only) | | |
| 3. Automated fulfillment (interactive text mode) | | |
| 4. UPC code | | |
| Vendor ID | Alpha-numeric | 16 |
| Description | Size | |
| Type | 1 | |
| 1. Test (internal use only) | | |
| 2. Retail | | |
| 3. Fulfillment | | |
| 4. UPC rate lookup | | |
| Unique Identifier | 15 | |
| Product/Offer ID (assigned by vendor), UPC | Alpha-numeric | 16 |
| From Phone/Firmware: | | |
| Phone Manufacturer | Alpha-numeric | 10 |
| Phone Model | Alpha-numeric | 10 |
| Phone Firmware Revision | Binary Coded Decimal | 4 |
| Symbol Reader Firmware Revision | Binary Coded Decimal | 4 |
| Payment method option (see paragraph 5. below) | | 2 |

Protocol for Menus-On-The-Fly

In order to query the cell-phone 15 for items such as product options (color, size etc), shipping, billing options, and other required information, this protocol within the message structure allows the fulfilling entity (business organization 21) to build a text or graphic menu to be displayed on the cell phone display. Upon sending the required information to the cell phone 15, the cell phone software is then responsible for displaying the menu (which could be a simple one text line (and/or graphic) display, capturing the resultant user 16 response, and sending the response back to the fulfilling vendor 21.

Within the payload data are embedded commands for formatting and displaying the menu item(s), as well as the data (text and/or graphical) to support the query. These embedded commands control defined functionality implemented on the cell phone 15. Because the capability of each cell phone depends upon the manufacturer and features selected by the user, it is known in the art that this finite set of functions with fixed API's may implement the commands differently for each type of phone while still performing the basic task defined by the protocol.

Payment Method

In many of the embodiments depicted in FIGS. 2-14, it may be convenient for the payment method to be established ahead of any particular purchase. Once such exemplary method is for the telephone company (TELCO) provider to be used as the gateway into one or more payment methods. This arrangement is made between the user 16 of the cell phone 15 and the TELCO provider. This arrangement may be as simple as the TELCO provider storing credit card or bank account numbers to be accessed when a purchase is made. In this case, the TELCO is simply a broker between the customer 16, the fulfillment entity 21, and the credit card agency or bank. If this arrangement is established, the fulfillment entity 21 is informed during the initial message from the cell phone, and when payment terms are required by the fulfillment entity, control is passed back to the cell phone 15 and a process controlled by the TELCO is implemented to complete the payment details. Passing of control from the fulfillment agency back to the TELCO is achieved by a unique payload message type as described in the protocols above.

Although the invention has been described with respect to preferred embodiments thereof, it will be understood by those skilled in the art that the foregoing and various other changes, omissions and deviations in the form and detail thereof may be made without departing from the scope of this invention.

The invention claimed is:

1. A method for facilitating a transaction with a business entity from a printed medium using a mobile communications device, the printed medium having a barcode, the barcode including direct contact data for the business entity and transaction data relating to the transaction, the method comprising:
   capturing a digital image of the barcode with the mobile communications device;
   decoding the digital image in the mobile communications device to retrieve the direct contact data and the transaction data;
   initiating a communication with the business entity via the mobile communications device using the decoded direct contact data; and
   transmitting the transaction data to the business entity to facilitate the transaction.

2. The method of claim 1 further including the steps of:
   storing user information in the mobile communications device; and
   transmitting the user information to the business entity subsequent to initiating the communication, the user information facilitating the transaction.

3. The method of claim 1 wherein the mobile communications device is a cell phone having a digital camera and the step of capturing the digital image is done with the cell phone digital camera.

4. The method of claim 3 wherein the direct contact data is a phone number for the entity, and the step of initiating the communication comprises automatically dialing the decoded phone number.

5. The method of claim 4 further including conducting a voice transaction as part of the communication.

6. The method of claim 5 further including storing user information in the mobile communications device; and transmitting the user information to the business entity subsequent to initiating the communication, the user information facilitating the voice transaction.

7. The method of claim 1 wherein the direct contact data is a web address for the entity, and the step of initiating the communication comprises automatically contacting the web address.

8. The method of claim 1 wherein the transaction data includes an identifier of a unique offer associated with the printed medium, and further including a step of the business entity initiating a transaction routine for the unique offer upon receiving the transaction data.

9. The method of claim 8 wherein the transaction data further includes an identification of the printed medium from which the transaction data was retrieved, and further including a step of the business entity tracking printed medium sources of incoming communications.

10. The method of claim 1 further including, after initiating the communication, steps of:
    receiving a transaction query at the mobile communications device from the business entity; and
    transmitting response data responsive to the transaction query to the business entity, said response data being input by a user of the mobile device.

* * * * *